(12) United States Patent
Onstott

(10) Patent No.: US 6,779,735 B1
(45) Date of Patent: Aug. 24, 2004

(54) AIR VENTILATION CONTROL SYSTEM

(76) Inventor: Richard S. Onstott, 3325 Lake Park Cir., Anchorage, AK (US) 99517

( * ) Notice: Subject to any disclaimer, the term of this patent is extended or adjusted under 35 U.S.C. 154(b) by 0 days.

(21) Appl. No.: 10/669,974

(22) Filed: Sep. 24, 2003

(51) Int. Cl.$^7$ ............................................. G05D 23/13
(52) U.S. Cl. ........................ 236/13; 165/248; 165/267; 236/46 R
(58) Field of Search ................................ 165/248–250, 165/267–269; 236/13, 46 R, 49.3

(56) References Cited

U.S. PATENT DOCUMENTS

| | | | | |
|---|---|---|---|---|
| 4,368,843 A | * | 1/1983 | Kai et al. ................... | 236/49.3 |
| 4,602,739 A | * | 7/1986 | Sutton, Jr. ................. | 236/46 F |
| 5,257,736 A | * | 11/1993 | Roy .......................... | 236/49.3 |
| 5,257,958 A | * | 11/1993 | Jagers ....................... | 454/238 |
| 6,209,331 B1 | * | 4/2001 | Lake et al. .................. | 62/180 |

* cited by examiner

Primary Examiner—William E. Tapolcai
(74) Attorney, Agent, or Firm—Michael J. Tavella

(57) ABSTRACT

A system that allows fresh air to be brought into a furnace as part of the return air circuit. This not only helps to replace stale air within a home, it also provides adequate air supplies to establish enough positive pressure within the dwelling to prevent air infiltration around windows, doors, forced air registers and around room perimeters of rooms along the baseboards. The system consists of a furnace that has a return air supply duct, an intake louver and filter for bringing fresh air into the system, an intake fan mounted to the intake, an intake duct that brings the fresh air from the intake louver to the furnace and a motorized damper, installed in the intake duct, to control the flow or air. These components are controlled by a control panel that works with the thermostat and furnace controls to operate the intake fan and damper as for optimum operation.

10 Claims, 10 Drawing Sheets

US 6,779,735 B1

AIR VENTILATION CONTROL SYSTEM

CROSS REFERENCE TO RELATED APPLICATIONS

Not Applicable

STATEMENT REGARDING FEDERALLY SPONSORED RESEARCH AND DEVELOPMENT

Not Applicable

BACKGROUND OF THE INVENTION

1. Field of the invention

This invention relates to air ventilation control systems and particularly to air ventilation control systems that provide fresh makeup air in tightly insulated buildings.

2. Description of the Prior Art

In the past, air ventilation systems in buildings and homes were simple-one opened and closed windows to adjust the comfort ranges in the building. Today, heating and cooling systems are considerably more complex. This complexity has been exacerbated by the latest building specification that call for the so-called super insulating of homes and other buildings. While the use of super insulating techniques has improved heating and cooling efficiency, it has produced problems. Because they are tightly sealed against drafts, these homes generally contain twice the insulation required in prevailing building codes, along with double or triple glazed windows. The envelope of this type of home is completely encased in a polyethylene air/vapor barrier, and all of its windows and doors are fitted with special seals to prevent the escape of heated inside air and its subsequent replacement by cool outside air. The tight sealing of these structures prevents the natural exchange of stale inside air for fresh outside air, which leads to elevated indoor air pollutant levels.

To overcome these problems systems have been developed to bring fresh air into the conditioned space to replace the "stale" air in the space. The problem in doing this is that the fresh air being introduced is usually at a different temperature than that of the inside space. Thus, for cold climates, bringing in fresh air means bringing in colder air that takes energy to heat before it can be used. Similarly, in hot climates the opposite problem exists. To solve this problem, air-to-air heat exchangers and mixing dampers have been developed.

U.S. Pat. No. 4,044,947 to Spethmann teaches a control apparatus for controlling an outdoor air damper and a recirculated air damper of an air conditioning system for maintaining a predetermined condition, such as temperature, and a predetermined volume of the air to be discharged to the zones supplied by the air conditioning system. In this manner, separate volume control dampers may be eliminated by requiring the outdoor air and recirculated air mixing dampers to perform both the functions of controlling the condition of the mixture of outdoor air and recirculated air and controlling the volume of the mixture of air supplied to the zones.

The control apparatus may also use variable gain amplifiers connected to a temperature sensor, which senses the temperature of the mixed air, either upstream or downstream of the fan, and a second input connected to at least one volume sensor responsive to the volume of air moving through the system. The outputs from the variable gain amplifiers are connected to the appropriate outdoor air damper and/or recirculated air damper for regulating the condition and volume of the mixture of outdoor air and return air supplied to the zones. In this way, upon an increase in the static pressure in the system, the gain of the amplifiers is adjusted to reduce the volume of air supplied to the system by the outdoor air and recirculated air damper. The volume of the system return is regulated by the same type of exhaust and recirculating air dampers.

U.S. Pat. No. 4,776,385 to Dean relates to those devices for enabling and disabling heating and cooling equipment and providing supplemental ventilation to an enclosure. An air intake unit is ducted to a central heating and cooling installation. The intake fan unit has an outside temperature thermostat associated therewith and which is wired to a control circuit that also monitors temperature in proximity to a thermostat-equipped exhaust fan unit located in an attic or upper crawl space. Sensing devices are used in association with the plurality of thermostats to selectively enable or disable the heating and cooling equipment and to actuate the intake and exhaust fan units, thereby providing ventilation in the space.

U.S. Pat. No. 4,735,130 discloses a fresh air make-up apparatus for a furnace located in an enclosed building that comprises an elongated diffuser housing positioned adjacent the furnace, with the housing having an inlet in communication with fresh outside air and a pair of outlets, one being connected to the cold air return of a forced air furnace at a point substantially upstream of the heat exchanger, and the other outlet leading to the room. The outlet leading to the cold air return provides fresh make-up air for the building, while the opening leading to the room provides both a means for diffusing and preheating the fresh air supplied to the cold air return and a means for providing fresh air diffused with warm room air to the combustion chamber of the furnace. The apparatus also includes a removable filter for removing contaminants from the fresh air. The apparatus can include a heat exchanger for preheating the fresh air with warm air from the warm air duct of the furnace. This warm air is then exhausted outside the building to provide a continuous air exchange within the building. Although this system is simple, it merely adds air to the intake of a furnace. Without any systematic conditioning or operating parameters.

U.S. Pat. No. 5,082,173 to Poehlman et al. teaches a dynamic environmental control system for controlling the environment in a super insulated tightly sealed home which uses a heat recovery ventilator (HRV) connected to a forced air heating system for ventilation. The system performs a number of functions according to predetermined priorities. Firstly, for health reasons, the system will initiate an air exchange if HRV running times have been inadequate to ensure a minimum fresh air content and at the same time to dilute air pollutants which build up over time in an unventilated home. In addition, in order to minimize the effects of high humidity outputs caused by cooking, bathing, washing or drying, the system permits the user to initiate a timed HRV run to rid the home of the anticipated humidity. Such operations are special events that are activated over a background monitoring of inside temperature gradients that can be equalized by the system activating a forced air system whenever a preset maximum value is exceeded. The system may also function in one of its aspects as a seven day four temperature setback thermostat and is programmed to initiate an HRV run to remove humidity from a home if the humidity level is not within a desired range or if an inside dew point violation is likely; provided that the inside and outside moisture levels are favorable for removing humidity from the home. However, it is limited in that it is designed for use during the heating season when a heater and an indoor ventilation system are in use and when the windows are closed to seal in the environment in the home. The device is also restricted by climatic conditions in that it can only be used effectively in relatively dry climates where the moisture content of outside air is normally lower than the desired moisture content of inside air. For this reason the system is less suitable for use in areas that experience a regular extended rainy season of several weeks or more during the heating season. Moreover, the system uses complex electronic circuits that control the system. Such circuits are difficult to program and maintain.

U.S. Pat. No. 5,881,806 to Rudd discloses a system that is a fan recycling control system for using the existing air distribution fan and ducts of an air conditioning system, having heating and/or cooling and/or humidifying and/or dehumidifying operating modes. The system is designed for the periodic distributing of ventilation air and mixing of air throughout the interior air space served by the air conditioning system during periods in which the air distribution fan is not operating due to lack of a positive signal from the thermostat for heating or cooling, or the humidistat for humidifying or dehumidifying, or constant fan modes. The fan recycling control provides a means for operating the air distribution fan for a first selectable time period after a second selectable time period from the end of the last operation of the air distribution fan, where the last operation of the air distribution fan could have been due to a positive signal from the thermostat or humidistat for heating or cooling or humidifying or dehumidifying or constant fan modes of the air conditioning system, or due to fan operation initiated by the fan recycling control. The system includes an outside air damper recycling control having a means to open a motorized outside air damper, for the purpose of drawing in ventilation air, each time the air distribution fan operates, and for as long as the air distribution fan continues to operate, having a means to cycle, periodically close then open, the outside air damper based on selectable time periods since it was last opened or closed, respectively, and having a means to cause the motorized outside air damper to close at the end of each operation of the air distribution fan. Although this system has many of the desired features, it has a complex set of controls to operate the system. This makes setting and operating the unit more difficult. For example, the control panel has three timers: one for fan off time, one for fan on time, and one for the damper cycle time. If any of these times are mis-set or not set, the system cannot function properly.

BRIEF DESCRIPTION OF THE INVENTION

The instant invention overcomes these difficulties. It is a system that allows fresh air to be brought into a furnace as part of the return air circuit. This not only helps to replace stale air within a home, it also prevents air infiltration, around windows, doors, floor registers, and wall base perimeters. This occurs through normal use of bathroom and kitchen ventilation units, which cause periods of negative pressure with the dwelling. The hardware of the basic system consists of a furnace that has a return air supply duct, an intake louver and filter through which fresh air enters into the system, an intake fan mounted to the intake, an intake duct that brings the fresh air from the intake louver to the furnace and a motorized damper, installed in the intake duct, to control the flow of air. These components are controlled by a control panel that works in conjunction with the thermostat and furnace controls to operate the intake fan and damper as needed and desired for optimum operation.

Specifically, the system is designed to control air recirculation and to introduce filtered fresh air into residential units at various times and for specific durations selected in a 24-hour period.

The system also:

a) shares control with the thermostat of a residential forced air furnaces;

b) initiates air recirculation at the times selected and for durations specified by the user;

c) operates in conjunction with or independent of heating or cooling cycles;

d) operates dampers and blowers to admit and control a flow of filtered fresh air through a duct tied into the return air plenum ahead of the furnace filter, to mix with the air circulated during periods of heating, cooling and recirculation;

e) operates heaters, in fresh air supply ducts, to pre-heat the incoming air during periods of extreme cold weather;

f) controls the blowers, in air-to-air heat recovery units, and associated damper networks-used for energy savings (regardless of climate) during make-up air supply, whether used in a residence with a forced-air heating/cooling system or one with a stand-alone recirculation/make-up air system;

g) can operate with unit controlled voltages of various magnitudes (e.g., 120 volts and below, either AC or DC, as dictated by voltage requirements of the components used);

h) can use differential pressure to establish the need for air intake;

i) can monitor for the presence of gases (e.g., carbon monoxide) to initiate air intake; and k) can shut-down air intake and recirculation upon detection of smoke using either an in-duct mounted smoke detector or other smoke or heat detection devices equipped with the necessary switch or relay contacts to disconnect the power to the control circuits. Unlike the prior art systems, which solve one problem, this system is designed to work in a variety of ways to ensure that the flow of air into a home is maintained to provide the optimum level of comfort and safety.

DETAILED DESCRIPTION OF THE INVENTION

Figure 1:
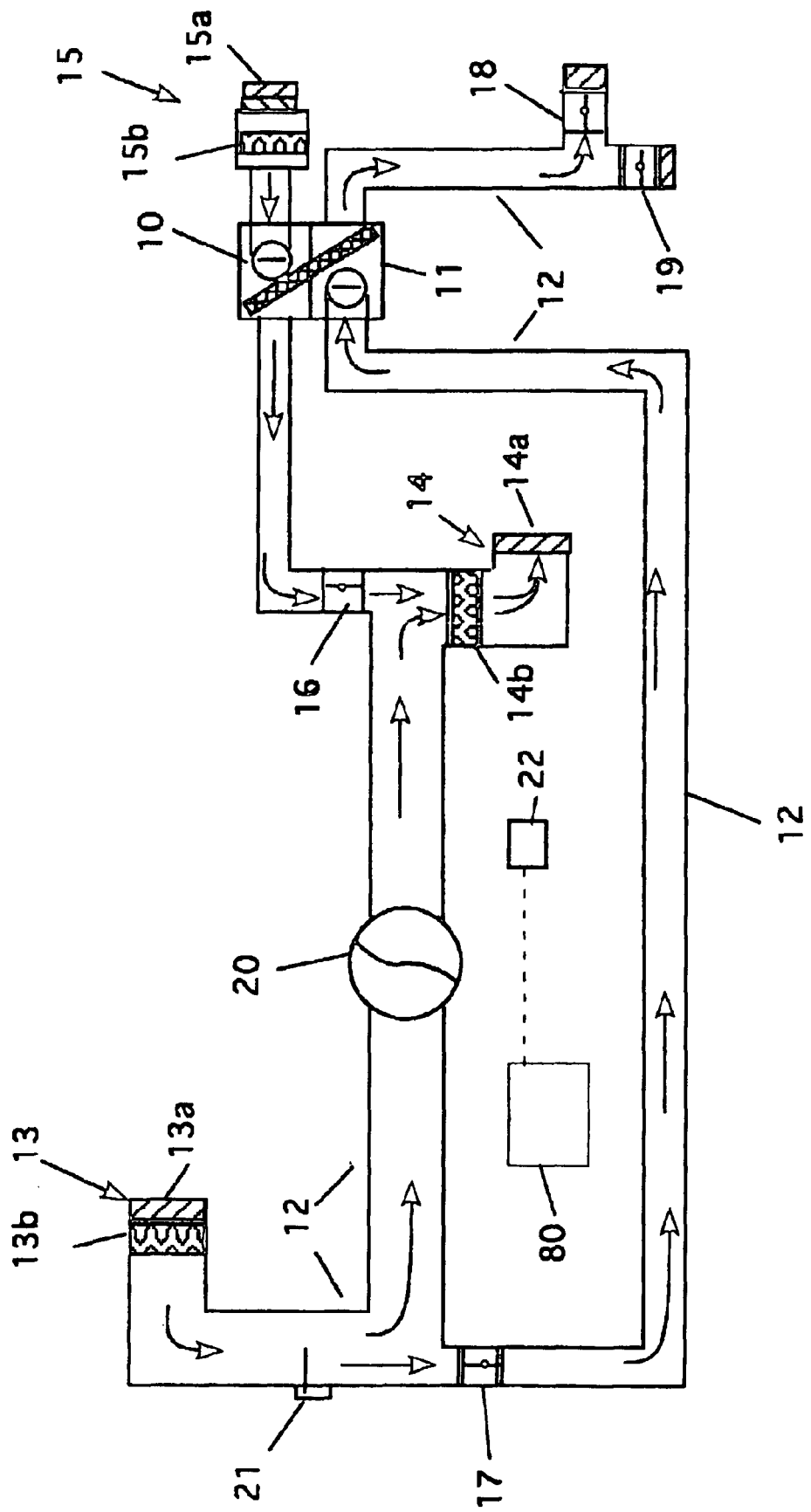
FIG. 1 is a mechanical schematic showing the components of the stand-alone system embodiment.

Referring now to the drawing figures, FIG. 1 is a mechanical schematic showing the components of a stand-alone air refreshing system. This diagram shows all of the parts of the system used in this embodiment. This system is intended for use where no forced air heating system is in place. It allows an operator to introduce fresh air into a building at regular intervals to break up stagnation and to remove stale air, as discussed above.

Referring to FIG. 1, the various hardware components are shown. These include an air intake fan 10, and an air exhaust fan 11. These components are ganged together to create an air-to-air heat exchanger.

As shown in the figure, air moves through a series of ducts 12. The specific airflows are discussed in detail below. To establish and control these airflows, several input filter stations and dampers are provided.

A recirculation air intake filter 13 provides the normal recalculating air to the system from the building. Under the "on" mode of operation, this input is fed exclusively to the blower motor for redistribution into the building. As shown, the air input can also be split as discussed below. Note also that all of the air filters shown have a grill element and a filter element; for the filter 13, these are labeled as the grill 13a and a filter element 13b.

Next, a recirculation air filter 14 is used to put air into the building from the blower fan. This is composed of a grill 14a and filter element 14b.

A fresh air intake air filter 15, with grill 15a and filter element 15b is shown on the input side of the air intake fan. 10. This filter cleans the incoming air. Note that it is designed to be positioned high on an exterior wall of a building.

To control the flow of air through the system several motorized dampers are used. A first damper 16 is placed in the duct after the air intake fan 10 but before the main junction with the output of the main blower fan. This damper, therefore, controls the flow of intake air into the system. A second damper 17 is positioned as shown, in the by pass duct that goes to the exhaust fan 11. A third damper 18 is positioned at the outlet grate of the exhaust duct that comes from the air exhaust fan 11. Note that this duct is designed to exhaust at a low spot on an exterior wall of the building. A fourth damper 19 can be installed to dump air into a space, such as a garage, to help provide additional conditioning as desired. This damper also attaches to the duct leading from the air exhaust fan 11.

The main recirculation blower fan 20 is shown in the center of the main duct of the system.

FIG. 1 shows the ability to operate the system in two basic modes. The first mode is the standard operating mode commonly used today. In this mode, the main fan 20 pulls air from the interior of the building through the return air duct 13, where it then flows back into the building through the filter and grill of the output grill 14. In this case, the dampers 16, 17, 18 and 19 are closed.

In the second mode of operation, the new air intake system is used. In this case, dampers 16,17, 18, and, if desired 19 are opened. In this system, the main fan 20 pulls air in through the return air duct 13. In addition, the air intake fan 10 pulls in outside air, which is ducted to the downstream side of the main fan 20 for mixing and distribution. Simultaneously, a quantity of the return air is ducted to the air exhaust fan 11. This heated air passes through the heat exchanger to pre-warm or pre-cool the incoming air. After passing through the heat exchanger, this air either is exhausted to the outside, or can be dumped into a less conditioned space, as desired. Airflows coming from the return air duct and air intake fan are mixed and then passed into the building through the filter and grill 14.

An induct smoke detector 21 can be placed in the ductwork on the intake side as shown. In addition, a carbon monoxide (CO) detector 22, which is not part of the ductwork system, can be installed and its contacts placed in the control circuit (as discussed below). Thus, as shown on FIG. 2, the CO detector has a set of contacts that overrides the timing portion of the circuit to cause fresh air to be introduced into the building.

Figure 2:
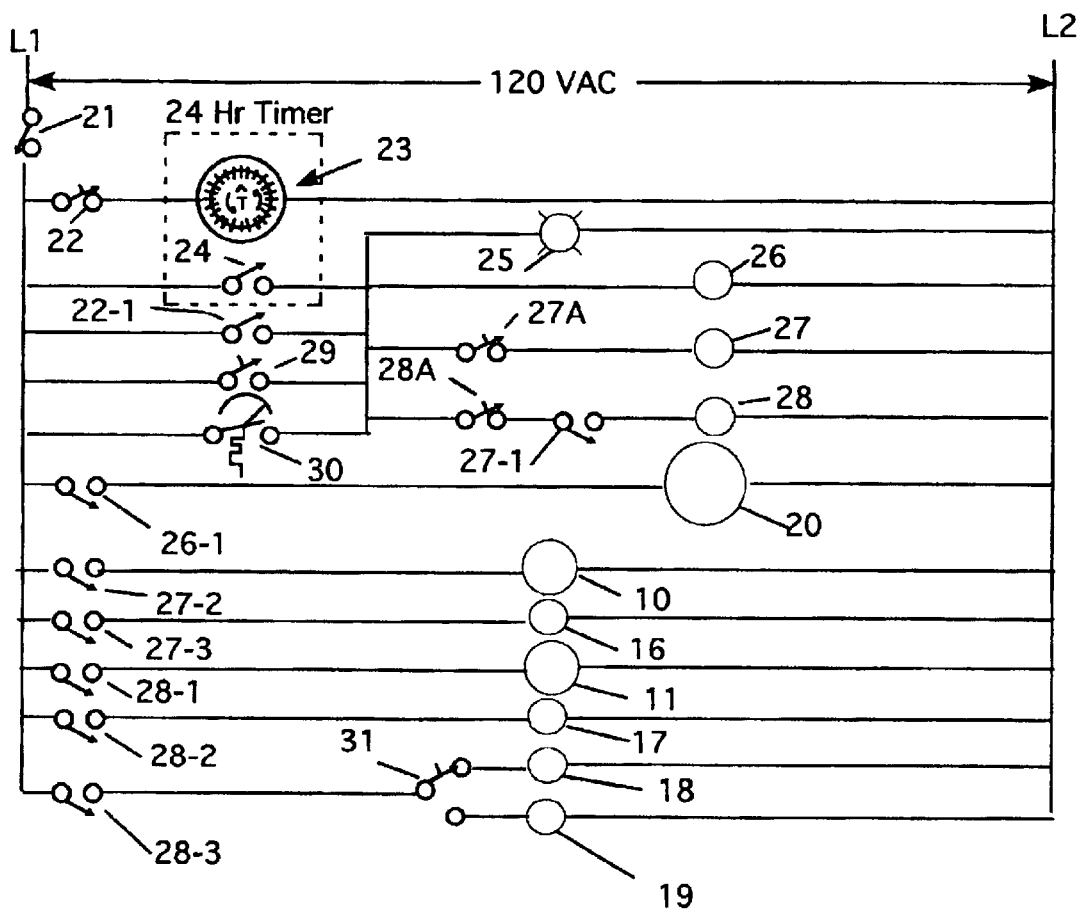
FIG. 2 is an electrical schematic of the stand-alone embodiment of the control system.

FIG. 2 shows an elementary electric schematic diagram for the system shown in FIG. 1. As discussed below, there are several ways to control the system to meet the needs of many different operating situations.

For all of the wiring diagrams, the following conventions apply. At the top of the diagram is the input to the circuit. The designations $L_1$ and $L_2$, indicate a source voltage. In all cases, this voltage is specified as 120 VAC. Of course, other voltages can be used, with the appropriate adjustments to the circuit being made. $L_1$ is deemed the "hot" leg of the circuit. The identifier $L_2$ is the neutral or common.

At the top of the circuit is a set of switch contacts from the in-duct smoke detector. If it detects smoke, these contacts open and all of the system is shut down. Next, is a timer circuit. This consists of a master on off switch 22, a timer 23 that has a timing element (discussed below) and an associated set of contacts 24. The timing element is connected to $L_2$, as shown. Again, details of the timing element are discussed below. The timing contacts 24 connect to a number of circuit elements as follows: First is a "Run" indicator light 25, which indicates that an operating or "run" sequence is occurring. It is mounted on the face of the control panel (see FIG. 9). Next, three relays 26, 27 and 28 are connected in parallel. Note that relays 27 and 28 have isolation switches 27-A and 28-A respectively to remove these elements from the circuit as desired. Additionally, relay 28 has a set of contacts 27-1 (the first number designates the relay, the second number the contact number within the relay) from relay 27 in the line. In this way, relay 28 will not operate if relay 27 is not operating (such as if the relay isolating switch 27-A is open).

In series with these elements are three sets of contacts. First, are the contacts from the CO detector, second a timer bypass switch 29 and third is the room thermostat 30. All of these contacts are normally open. If any or all should close, the timer is bypassed and the circulation system operates without the timer. Normally, the CO detector switch 22-1 and the timer bypass switch 29 are not operated regularly. The room thermostat, however, operates according to ambient air conditions. The operation of the system using the thermostat is discussed below.

The elements shown below those discussed above are the fan motors and damper motors. These are controlled by relay contacts shown in the circuit. The main fan 20 is controlled by a normally open contact 26-1. Below that is the air intake fan 10, which is controlled by normally open contact 27-2. Below that is damper 16, which is controlled by normally open contact 27-3. Below that is the air exhaust fan 11, which is controlled by normally open contact 28-1. Below that is damper 17, which is controlled by normally open contact 28-2. Below that are dampers 18 and 19, which are controlled both by a normally open contact 28-3 and by a selector switch 31. This switch is used to select which damper (18 or 19) to operate, which causes air to be dumped either outside (through damper 18) or to a secondary space, such as a garage (damper 19).

Normal operation of the system just described is as follows:

The room thermostat and the main fan 20 can be selected to run continuously or can be set to operate when the room thermostat is activated. Otherwise, the system operates by the timer. Assuming the entire system is activated as shown in FIG. 2, when the timer is activated, the intake and exhaust fans and all of the dampers (for dampers 18 and 19 only one is selected at a time) are open and operational. In the preferred embodiment, the timer is set to operate the system for 15 minutes (adjustable plus or minus) and to leave it off for 60 minutes (adjustable plus or minus). Note that such timers are readily available commercially in a variety of models. In the circuit of FIG. 2, if the thermostat activates, the timer is bypassed and the system operates until the thermostat opens. Thus, if the thermostat activates during the 15-minute timing cycle, no difference is noted. If the thermostat activates during the 60-minute quiet time, the system will operate independently of the timer. The advantage of this system is that it allows the fans to operate without the thermostat activating.

Figure 3:
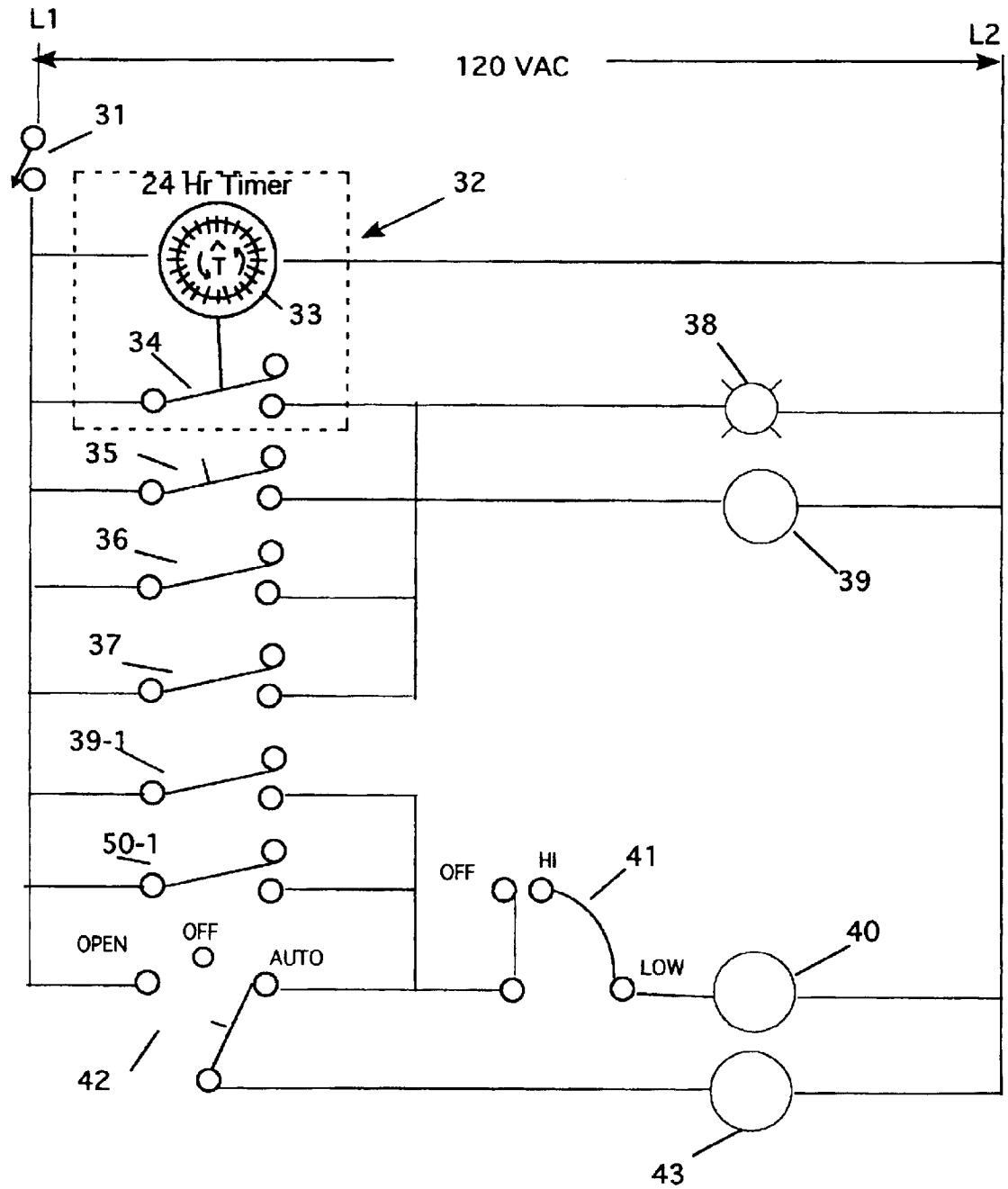
FIG. 3 is an electrical schematic of the 120 VAC portion of a second embodiment of the control system in which a furnace or air conditioning unit is incorporated into the system.
Figure 4:
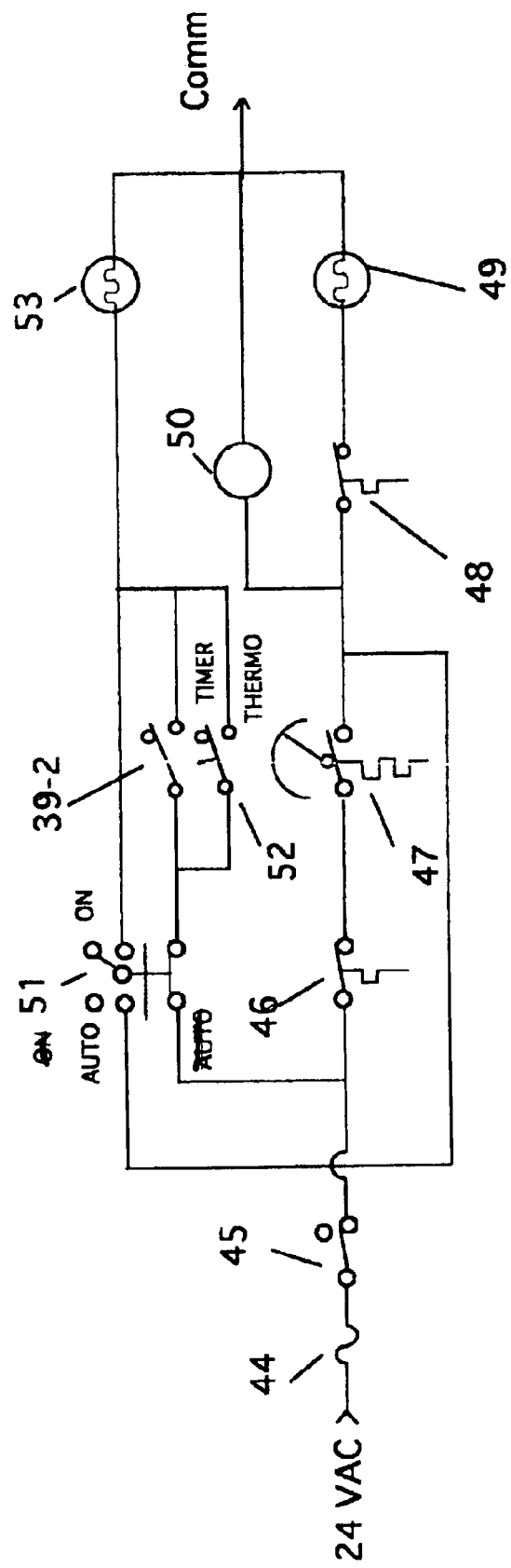
FIG. 4 is an electrical schematic of the 24 VAC portion of a variation of the control system of FIG. 3.

FIG. 3 shows a schematic for a second embodiment of the invention. In this embodiment, the system is integrated with a forced air furnace or air conditioner. In this embodiment, there is no air-to-air-heat exchanger, although one can be added, as discussed below. The primary purpose of this system is to provide a source of clean, fresh air to mix with recirculated air in a forced air heating or cooling system. It also works to refresh the air in a building by operating independently from the heating cycles of the furnace as desired. Unlike the stand-alone system discussed above, this system uses the furnace blower motor to circulate air through the building. It has an intake air filter, an intake air fan, and a duct that moves the air to the furnace. Within the duct, there is a damper to control the flow or air. As in the embodiment above, an in-duct smoke detector may be placed within the duct as a safety measure. The specifics of this system, designated as the "integrated system" are as follows:

Referring now to FIGS. 3 and 4, the integrated system electrical schematics are shown. FIG. 3 shows the 102 VAC system. As before, L1 and L2 signify the 120 VAC line inputs. The first component on L1 is a contact 31 from an in-duct smoke detector. This contact is normally closed. In the event of smoke detection, it opens the circuit and shuts down the system. The 24-hour timer 32 is placed in the line as shown. As before, this timer has a timing component 33 and a contact component 34.

Below the timer, in sequence, are the timer bypass switch 35, the contacts 36 from the CO detector, and a contact from a differential pressure switch 37 (discussed below). These switches and contacts are connected to a running light 38 and a relay 39.

Below those components are a contact 39-1 from relay 39 and a contact 50-1 from relay 50. Either of these contacts operates an air intake fan 40. The air intake fan 40 has a speed control switch 41 in the circuit as shown. Finally, at the bottom of the circuit is a damper control switch 42 that controls the damper motor 43. The switch 42 has two modes: open, in which the damper is open continuously, or "off", in which the damper remains closed, or auto, in which the damper is controlled by the contacts 39-1 and 50-1, which operate in conjunction with the air intake fan 40.

FIG. 4 is the 24 VAC circuit for this system. Beginning at the left of the figure, at the 24 VAC input terminal, the circuit begins with fuse 44, followed by a normally closed contact 45 of an in-duct smoke detector. The circuit extends on into the furnace control to a temperature limit switch 46, which is connected to the common terminal of the room thermostat switch 47. From the normally open contact of the room thermostat, connection is made back into the furnace through the stack over temperature switch 48 and the power vent relay 49 to the common side of the 24 VAC supply.

The circuit branches after the room thermostat, where it feeds relay 50, which then connects to the common terminal. As discussed above, the contacts 50-1 for relay 50 are shown in FIG. 3.

The circuit branches before the temperature limit switch 46 to go to the "on" side of the thermostat's fan control switch 51, then to contact 39-2 of relay 39 (FIG. 3), which is in parallel with the furnace blower control switch 52. The outputs of these connect to the indoor blower relay 53, located in the furnace. This describes the system with the thermostat's fan control switch set to "on" position, in which case the blower runs continuously but for the timed interventions from the control panel shown in FIG. 3.

The other pole of the room temperature fan switch 51 is labeled auto. In this mode, the blower runs only during heating cycles, as its control is operated only when the thermostat calls for heat. The room temperature thermostat fan switch 64 is a switch located in many thermostats. It allows the user to set the circulating fan in the furnace to run continuously (in the "on" position") or cyclically, when the furnace operates (in the "auto" position).

What follows is a description of system operation: the control system has an air intake fan speed control that adjusts the fan speed so that the amount of filtered outside fresh air being introduced to the system is as desired. In the preferred embodiment, the control has an adjustable range from OFF to HIGH and down to LOW.

Even if the Air Intake Fan is shut OFF; as long as the system is under control of the system, the furnace blower will come on and the damper will still open at times preset for air circulation to admit makeup air to counter possible inside air deficiencies. The damper also operates as usual during heating cycles.

System Shutdown

If for any reason it is desired to completely eliminate system control of the heating/ventilating system and return full furnace control exclusively to the Room Thermostat:

1. Switch the Furnace Blower Control switch to Thermostat.

2. Shut off the circuit breaker for the unit in the Power Distribution Panel.

3. Set the Room Thermostat Fan (RTF) switch for the desired mode of operation:

On=furnace blower runs continuously providing constant inside air circulation.

Auto=furnace blower runs only during heating cycles.

Note: with the system shut down, filtered, fresh, makeup air no longer enters to mix with the return air during air circulation or heating cycles to compensate for air deficiencies.

Figure 5:
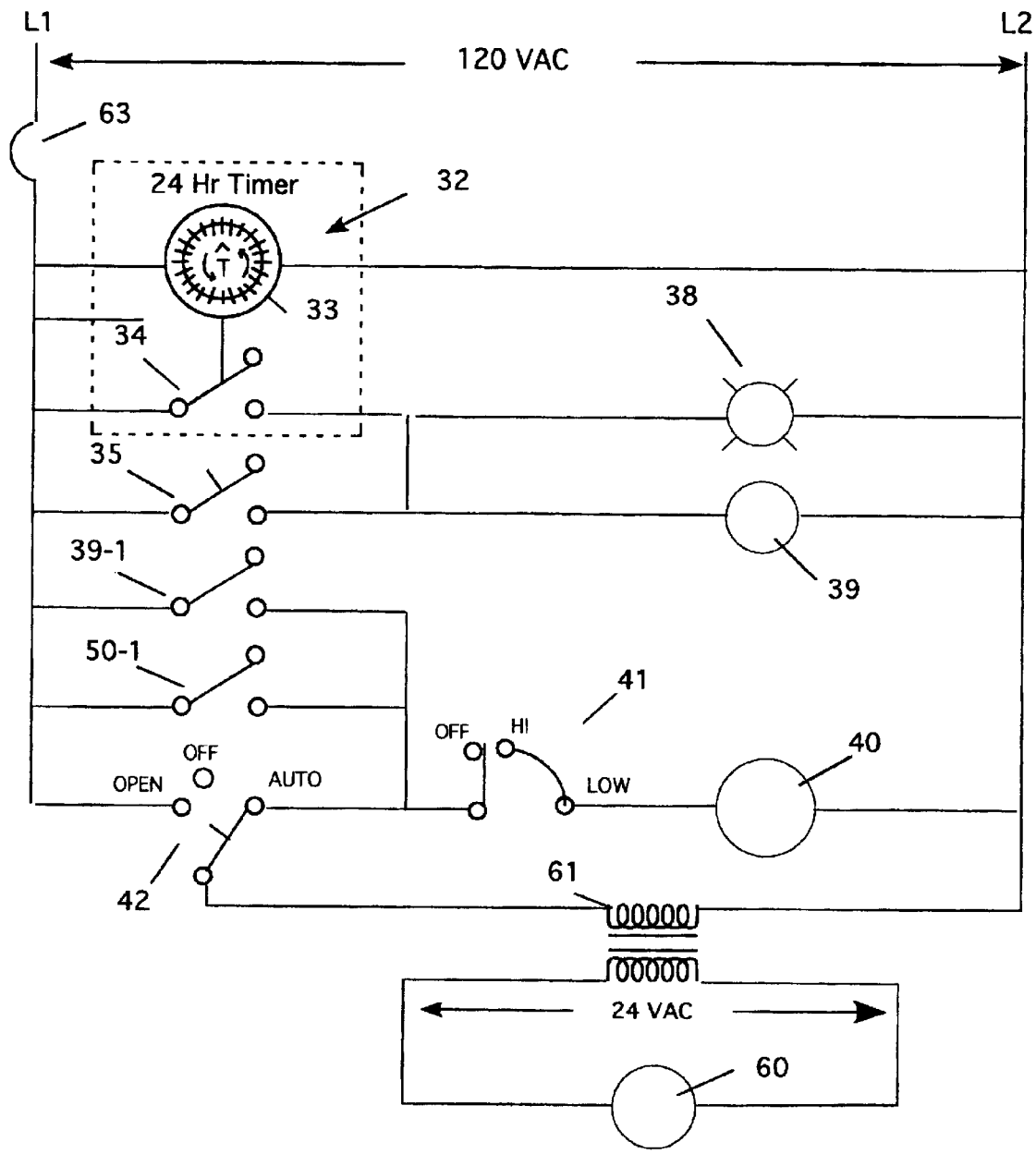
FIG. 5 is an electrical schematic of another variation of the 120 VAC portion of the control system of FIG. 3.
Figure 6:
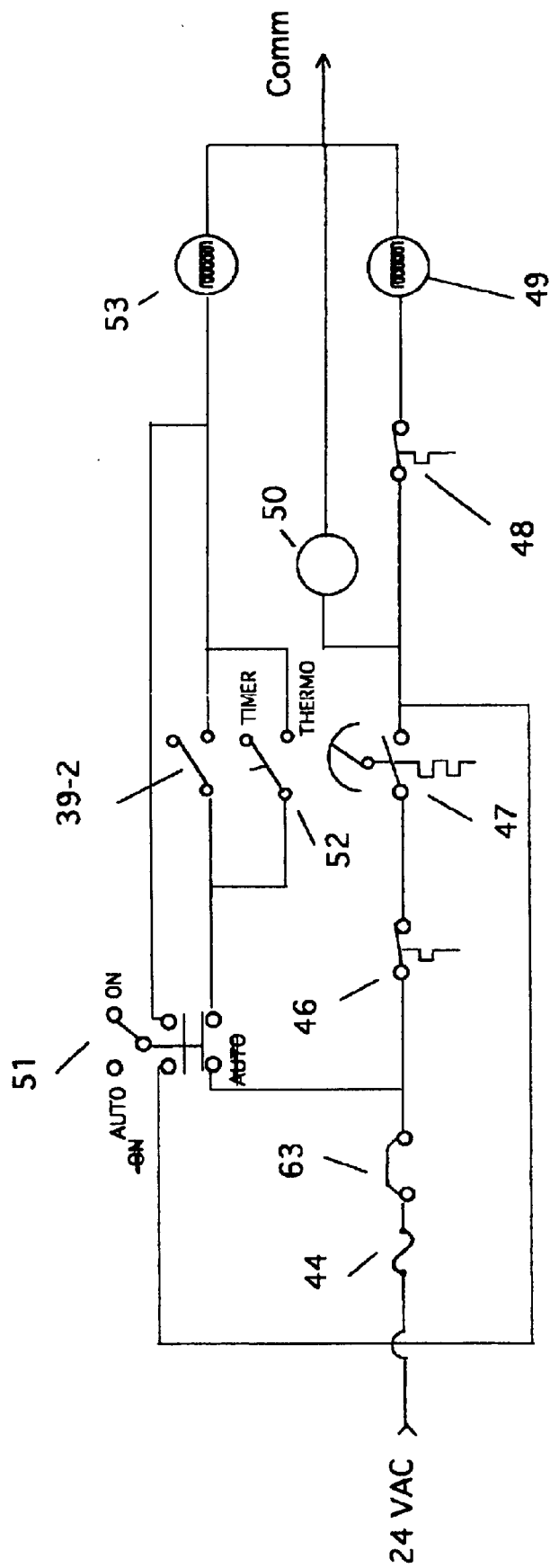
FIG. 6 is an electrical schematic of another variation of the 24 VAC portion of the control system of FIG. 3.

This describes the basic, preferred, design for the combined, intake system and furnace (cooler) system. The remaining circuit diagrams show variations of this basic circuit. These are discussed in turn below:

FIGS. 5 and 6 show the system discussed above with the following changes. First, the 120 VAC damper motor 43 is replaced with a 24 VAC damper motor 60, which is supplied by a transformer 61 from the 120 VAC circuit. The second change is that the contacts 31 and 45 from the in-duct smoke detector have been replaced by jumpers 63 in cases where no in-duct smoke detector is used. Note also that this figure eliminates the CO detector 36 and the differential pressure switch 37 (see FIG. 3). Of course, both of these components can be added to any of the circuits shown, either alone or in combination, as desired.

Figure 7:
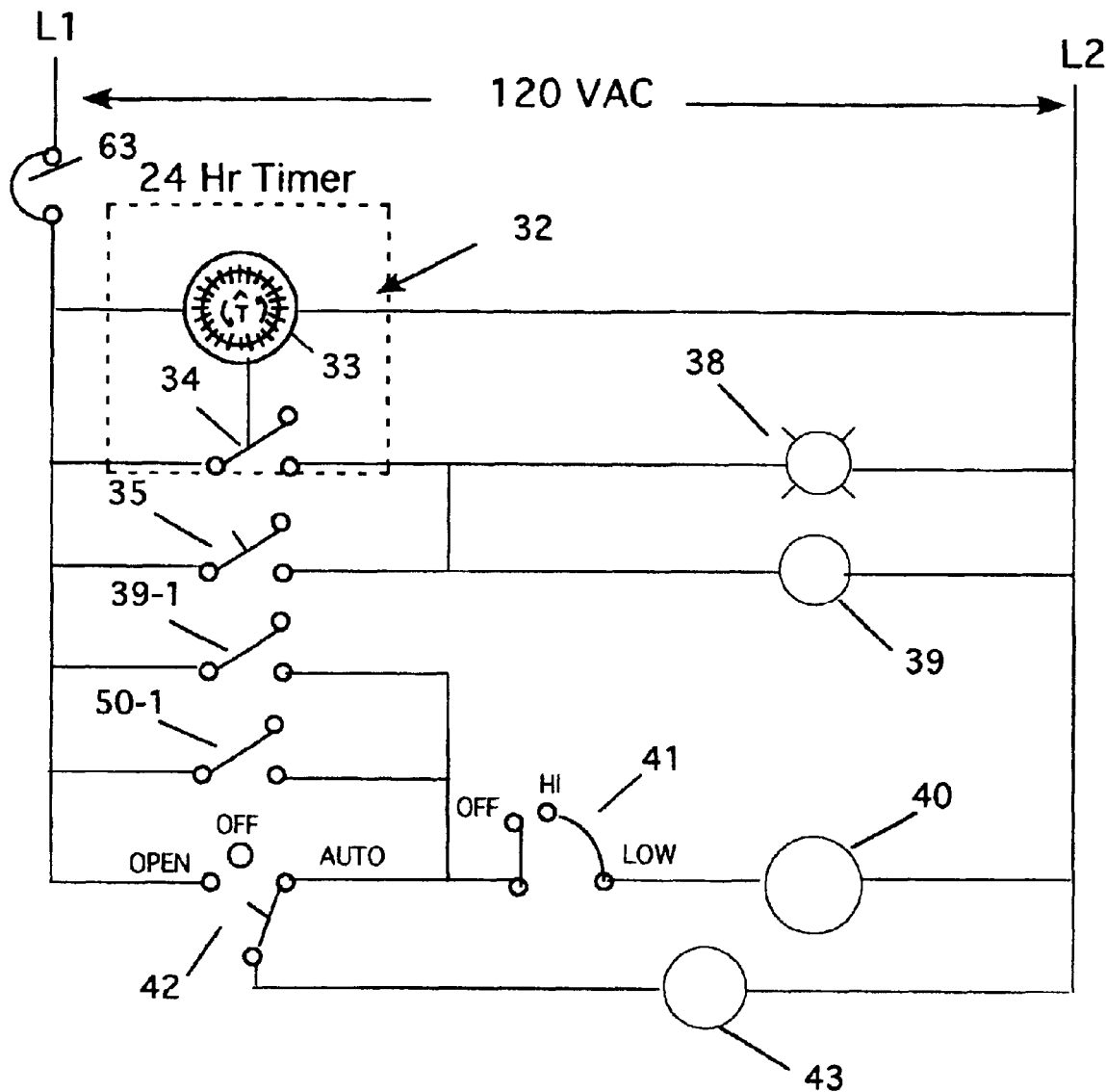
FIG. 7 is an electrical schematic of a second optional circuit configuration of the 120 VAC portion of the control system of FIG. 5.

FIG. 7 shows a variation of the circuit of FIG. 5. In this circuit, the 24 VAC damper motor 60 is replaced with a 120 VAC damper motor 43. This also eliminates the need for the transformer 61 of FIG. 5. FIG. 7 is otherwise identical to that of FIG. 5.

Figure 8:
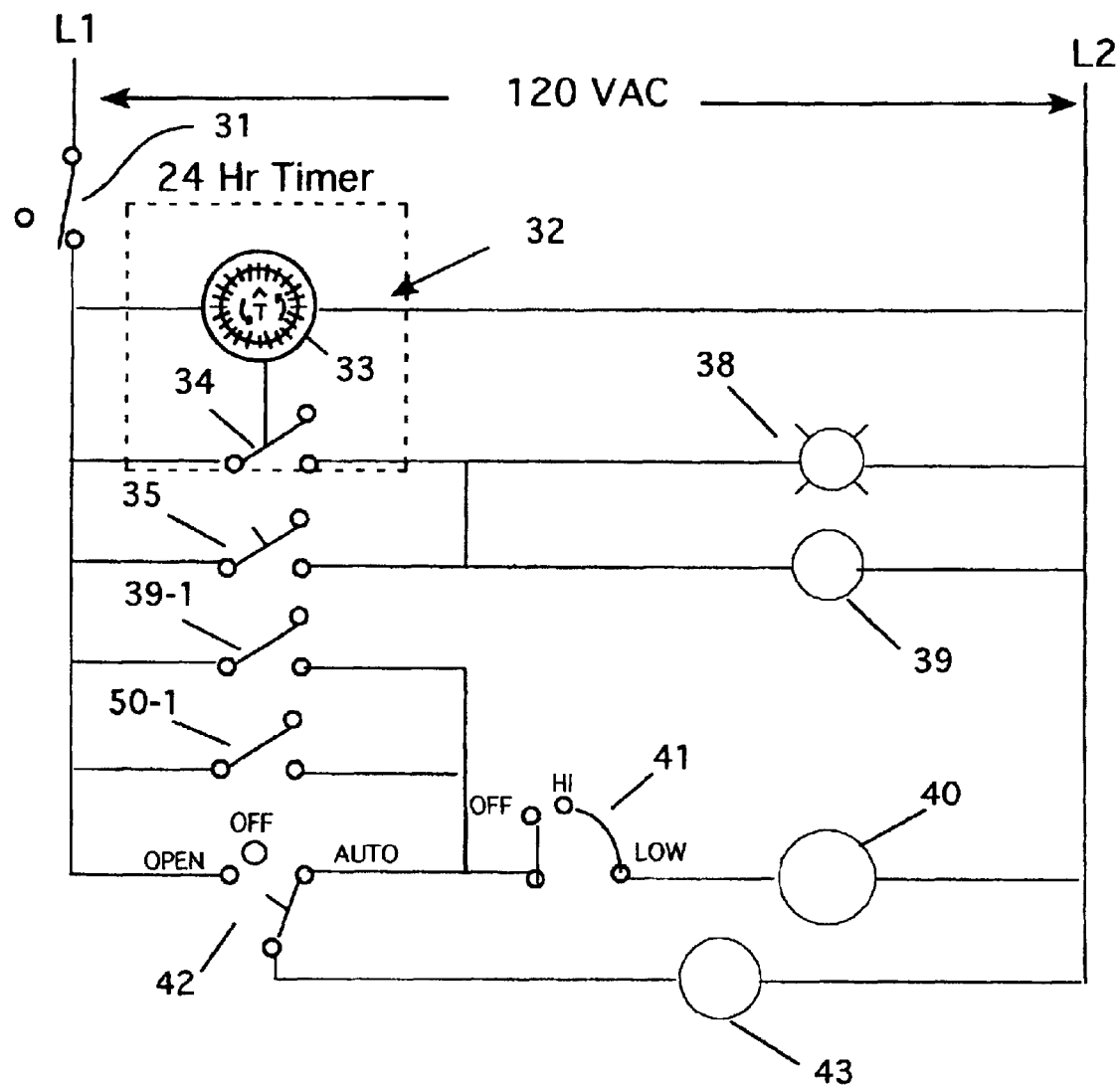
FIG. 8 is an electrical schematic of a third optional circuit configuration of the 120 VAC portion of the control system of FIG. 5.

FIG. 8 is a minor variation of FIG. 7. In addition to changing the 24 VAC damper motor to a 120 VAC damper motor, FIG. 8 shows the jumper 63 for the in-duct smoke detector has been replaced with contacts 31 for the in-duct smoke detector.

Figure 9:
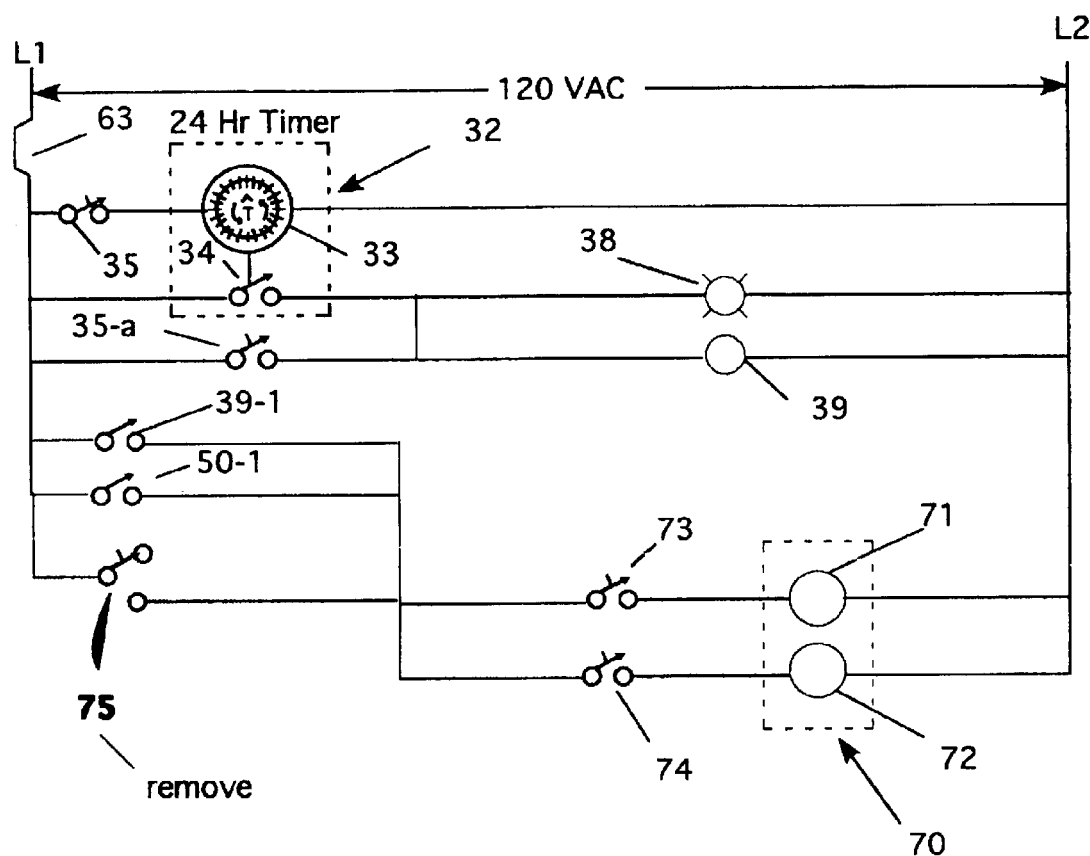
FIG. 9 is an electrical schematic of a fourth optional circuit configuration of the 120 VAC portion of the control system of FIG. 5.

The final variation of this circuit is shown in FIG. 9. Here, the damper motor and air intake fan have been replaced by a heat recovery ventilator 70. This heat recovery ventilator is similar to that shown in FIG. 1. In this example, the heat recovery ventilator 70 has an air intake fan 71, an air exhaust fan 72, an air intake fan control switch 73 and an air exhaust fan control switch 74. These switches are designed to turn these fans on or off. The fan speed control is eliminated from this circuit. A timer bypass switch 75 has been added as shown. Note also that the bypass switch is ganged with components 35 and 35-a. In this way, if the bypass is opened, the timer is disconnected and the relay 39 is continuously activated. All other aspects of the system remain the same as shown in FIGS. 5 and 6.

Operation

The system places a set of timed contacts in the furnace blower control circuit so that inside air automatically circulates at selected times, in sequences and for durations programmed in the timer, while it adds variable amounts of filtered fresh air that mixes into the system before furnace return air filters. When the furnace is operated by the room thermostat with the room thermostat fan switch in the "auto" position, outside air is admitted only during the heating cycles and air circulation does not continue once the demand for heat has been satisfied. When the room thermostat fan switch is "on" (as shown), the automatic recirculation of inside air takes place as programmed in the system control panel. Thus, the blower fan operates at the times specified and set into the timer. If the room thermostat calls for heat during a time that air is being circulated, the furnace blower and continues air circulation for the set-time remaining. If the thermostat calls for heat when the timer is quiescent, the timer is overridden and the blower operates. If the thermostat shuts down while the timer is still in the quiescent period, the blower stops operating.

Figure 10:
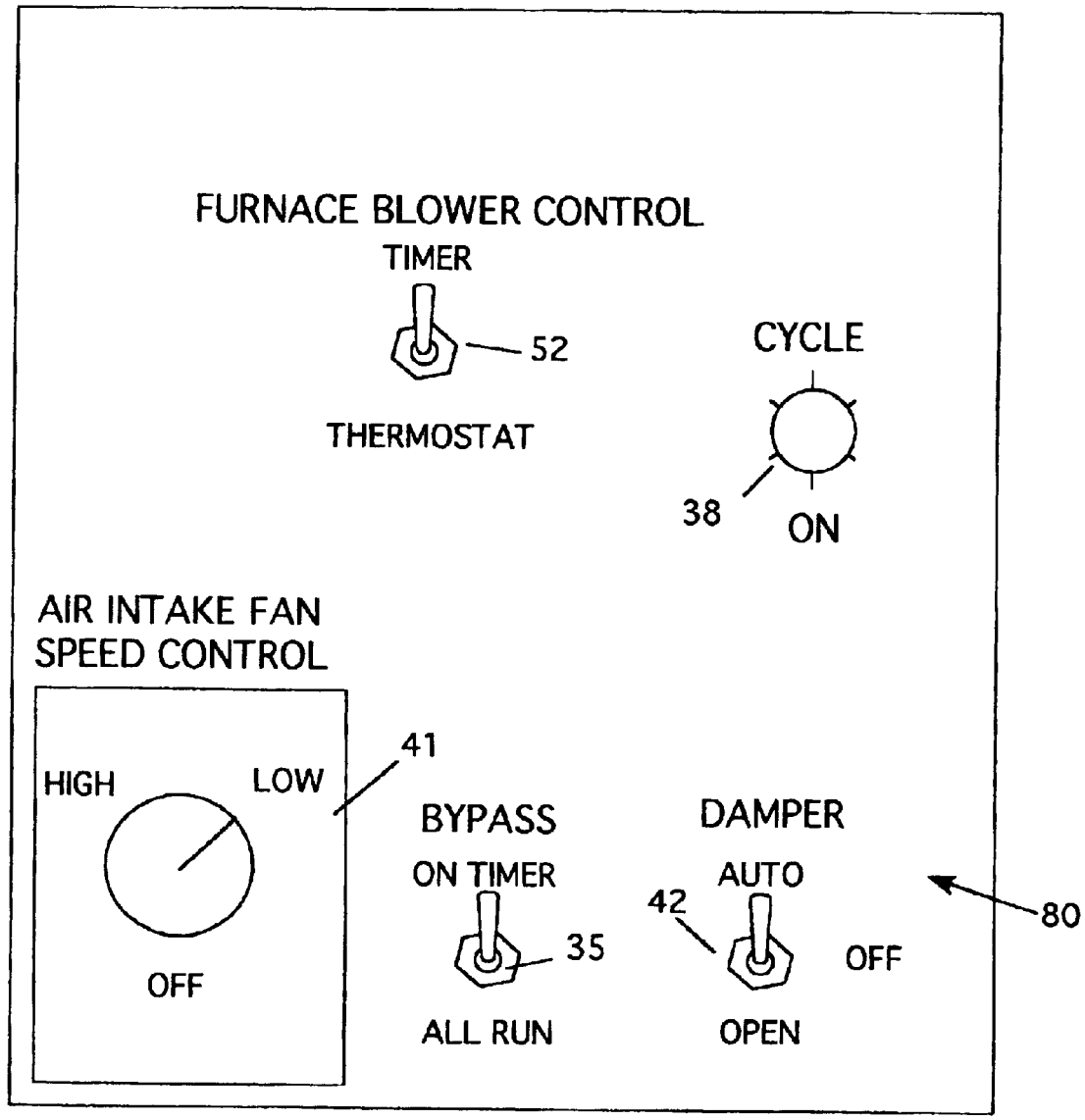
FIG. 10 is a front view of the system control panel box.

FIG. 10 is a detail of the front panel controls of the control panel 80. These controls are as follows. At the top is the Furnace Blower Control Switch (e.g., 52 on FIG. 4). This switch selects two different controlling units: first is the timer, which places the furnace Indoor blower (e.g., 40) under control of the timer in this position, as long as the room thermostat fan switch is set to "on", programmed air circulation takes place in accordance with the timer settings. The room thermostat controls heating in conjunction with the timed blower operations (as discussed above).

With the switch set to the thermostat position, the room thermostat takes full control of furnace for all functions, e.g., burner operation during calls for heat, etc. With room thermostat fan switch control of furnace for all functions, e.g., burner operation during calls for heat, etc. With room thermostat fan switch 51 set to "on", the furnace blower would run continuously but for intervention by the system's timer which limits introduction of filtered outside air to set periods and during heating cycles. With room thermostat fan switch 51 set to "auto", the furnace blower 40 runs only during the heating cycle, with filtered outside air added only during the cycle.

The bypass switch 35 is used to over-ride the system control unit. If the switch 35 is in the "on timer" (normal) position, the timer is used to operation of the damper, air intake fan and the furnace blower. In the "all run" position, the damper opens, and the air intake fan and furnace blower run continuously (but only if the room thermostat fan switch 51 switch is also in the "on" position).

The damper switch 42 can set the damper to be off, open, in which case it is open all the time, or on "auto", where it opens and closes by timer operation.

The air intake fan speed control 41 allows the user to manually set the fan speed. As discussed above, the speed control can be set to operate on low speed or "off" when outside ambient air temperatures are low and higher when outside air temperatures are warm.

Finally, the indicator light 35 illuminates when an air introduction/circulation cycle is in progress.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A method of mixing air in an interior space when not conditioning the air by an air conditioning system having a return air duct a circulation fan, and a thermal conditioning element, an outside air damper connected to an external air duct, an outside air intake fan, installed in said external air duct, the external air intake duct being connected to the return air duct of the air conditioning system, comprising the steps of:
    a) activating said outside air damper and said circulation fan for a pre selected operating time, independent of said thermal conditioning element;
    b) pulling outside air into said external air duct;
    c) mixing said outside air into the return air duct, of said air conditioning system, producing a quantity of mixed air;
    d) distributing the mixed air into a closed space;
    e) shutting down the circulation fan after a predetermined operating time;
    f) keeping the circulation fan shut down for a pre-selected quiescent time; and
    g) repeating steps a–f for an extended period of months.

2. The method of claim 1, further including: the step of closing the damper when the circulation fan is shut down.

3. The method of claim 1, wherein the air conditioning system includes at least one of: a cooling means, a heating means, and an air cleaning means.

4. The method of claim 1, wherein the air conditioning system further includes a thermostat.

5. The method of claim 4, further comprising the steps of
   a) setting said thermostat to a desired room temperature setting;
   b) connecting said thermostat to an operating control for said thermal conditioning element;
   c) operating said thermal conditioning element when said desired room temperature varies from the desired room temperature setting;
   d) causing said circulating fan to operate independently of said pre-determined operating time; and
   e) shutting down said thermal conditioning element when said desired room temperature setting is reached.

6. The method of claim 5, further comprising the steps of:
   a) determining the status of the predetermined operating time; and
   b) shutting down the circulating fan if the predetermined operating time is the quiescent predetermined operating time; or
   c) operating said circulating fan if the predetermined operating time is the operating predetermined operating time.

7. The method of claim 1, wherein the air conditioning system further comprises a damper motor.

8. The method of claim 7, further comprising the steps of:
   a) causing said damper motor to open said damper at said pre-determined operating time; and
   b) causing said damper motor to close said damper at said pre-determined quiescent time.

9. The method of claim 1, wherein the air conditioning system further comprises a smoke detector, installed in said duct, and a means for overriding said means for controlling the operation of said return air duct in operable communication with said smoke detector.

10. The method of claim 9, further comprising the steps of:
    a) causing said air conditioning system to shut down upon detection of smoke in said duct by said smoke detector.

* * * * *

UNITED STATES PATENT AND TRADEMARK OFFICE
CERTIFICATE OF CORRECTION

PATENT NO.    : 6,779,735 B1
DATED         : August 24, 2004
INVENTOR(S)   : Richard Onstott It is certified that error appears in the above-identified patent and that said Letters Patent is hereby corrected as shown below:

Title page,
Item [57], ABSTRACT,
Line 6, after "around", please delete "room".

Column 5,
Line 64, after "the filter", please insert -- element --.
Line 64, please delete "output grill" and insert therefor -- filter --.

Column 6.
Line 1, please delete "duct" and insert therefor -- filter --.
Line 15, after "its contacts", please insert -- 22-1 --.
Line 35, after "switch", please delete "22" and insert therefor -- 23a --.

Column 7,
Line 43, please delete "that moves the air" and insert therefor -- through which air flows --.
Line 51, please delete "102" and insert therefor -- 120 --.

Column 8,
Line 2, after "has", please delete "two" and insert therefor -- three --.
Line 5, please delete "which" and insert therefor -- to --.
Line 34, after "fan switch", please delete "64" and insert therefor -- 51 --.

Column 9,
Line 32, after "These", please insert -- isolation --.
Line 33, after "on or off", please insert -- to permit fresh air intake without preheating or precooling or to disable the HRV for maintenance or when fresh air intake is not desired. --.
Lines 33-38, please delete all text beginning with "The fan speed control is eliminated" and ending with "the relay is continuously activated."
Line 38, before "All other aspects", please insert -- The HRV can be run continuously and independent of the timer if bypass switch 35-a is closed to energize relay 39 closing contacts 39-1 to provide the path. --.
Line 56, after "furnace blower", please insert -- may increase speed (if so programmed) during the heating cycle, after which it sets back --.
Line 67, please delete "timerin this position" and insert therefor -- timer. In this position --.
Line 63, after "panel 80", please insert -- (fig. 1) --.

UNITED STATES PATENT AND TRADEMARK OFFICE
CERTIFICATE OF CORRECTION

PATENT NO. : 6,779,735 B1
DATED : August 24, 2004
INVENTOR(S) : Richard Onstott

It is certified that error appears in the above-identified patent and that said Letters Patent is hereby corrected as shown below:

<u>Column 10,</u>
Lines 7-9, please delete the text beginning with "With the room thermostat" and ending with "calls for heat, etc."
Line 19, after "is used to", please delete "operation of" and insert therefor -- operate --.

Signed and Sealed this

Eighteenth Day of January, 2005

JON W. DUDAS
*Director of the United States Patent and Trademark Office*